United States Patent [19]

Bull

[11] Patent Number: 4,832,358
[45] Date of Patent: May 23, 1989

[54] TRAILER FIFTH WHEEL-GOOSENECK CONVERSION ADAPTER

[76] Inventor: Garland E. Bull, Rt. 3, Box 670, Dardanelle, Ark. 72834

[21] Appl. No.: 176,685

[22] Filed: Apr. 1, 1988

[51] Int. Cl.$^4$ ............................................. B62D 53/04
[52] U.S. Cl. ............................... 280/418.1; 280/491.5; 280/441.2
[58] Field of Search ........... 280/415 R, 415 A, 415 B, 280/423 B, 491 D, 491 E

[56] References Cited

U.S. PATENT DOCUMENTS

| | | | |
|---|---|---|---|
| 3,810,661 | 5/1974 | Lowrance | 280/415 B |
| 3,840,252 | 10/1974 | Jocoy | 280/415 A |
| 3,881,749 | 5/1975 | Berends | 280/415 B |
| 3,889,978 | 6/1975 | Kann | 280/415 B |

*Primary Examiner*—Mitchell J. Hill
*Attorney, Agent, or Firm*—Robert R. Keegan

[57] ABSTRACT

There is disclosed an adapter apparatus for permitting a trailer or similar vehicle intended to be towed from a rear-mounted ball hitch on a truck to rather be coupled to and towed by a truck having a fifth wheel type hitch. The apparatus includes a gooseneck with a kingpin adapted to engage the fifth wheel mount of a truck, a gooseneck mounting element for receiving the gooseneck in a horizontally adjustable manner and two upright columns which are rigidly secured to the tongue of the trailer on either side of the ball hitch and on which the mounting element is slidably attached. The columns and the gooseneck arm are of steel with rectangular cross-section and slidably engage respectively in steel box-beam portions of the mounting element. Each column and the arm include holes which selectively match a pair of holes in the mounting element. A pair of pin elements secure the mounting element against relatively sliding movement. The pin elements may be secured in place by padlocks for security against theft.

17 Claims, 3 Drawing Sheets

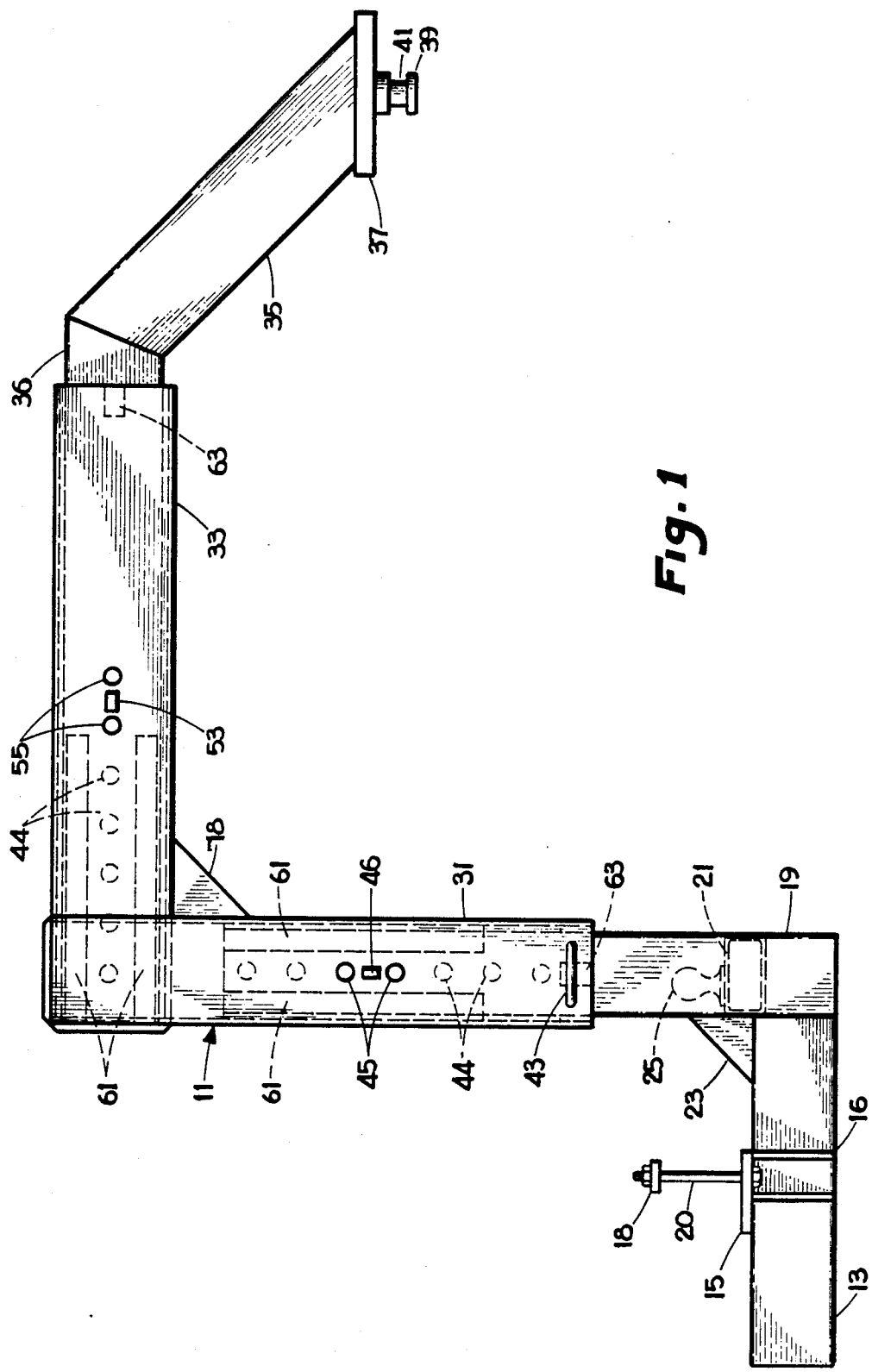

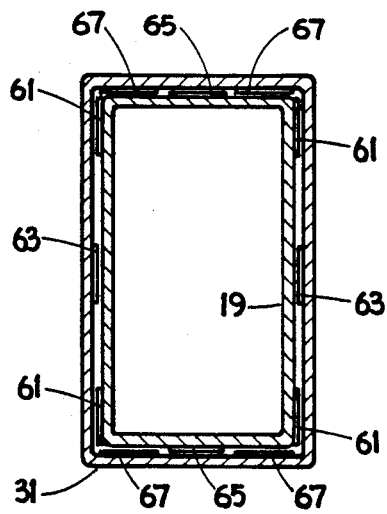
Fig. 4
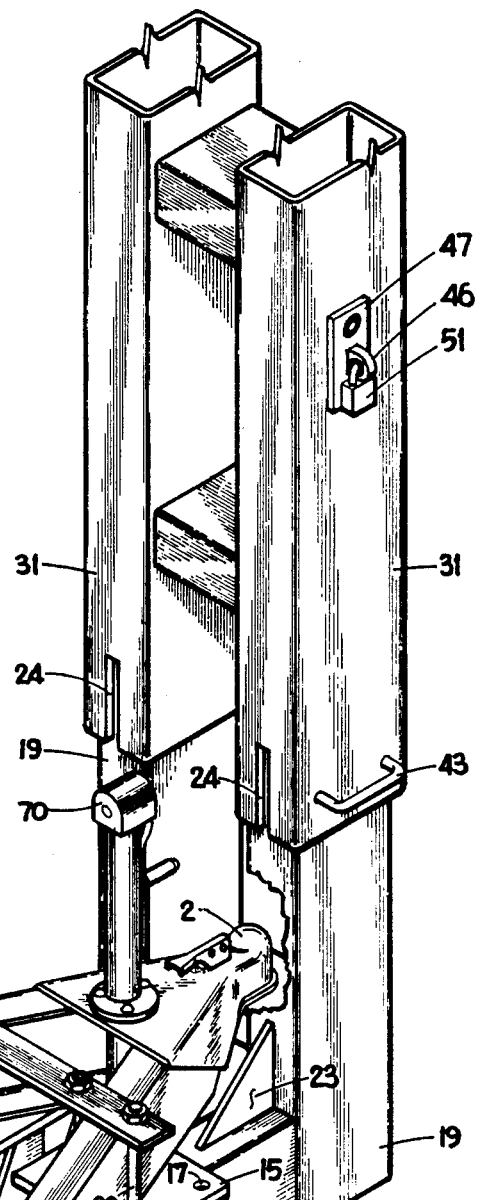
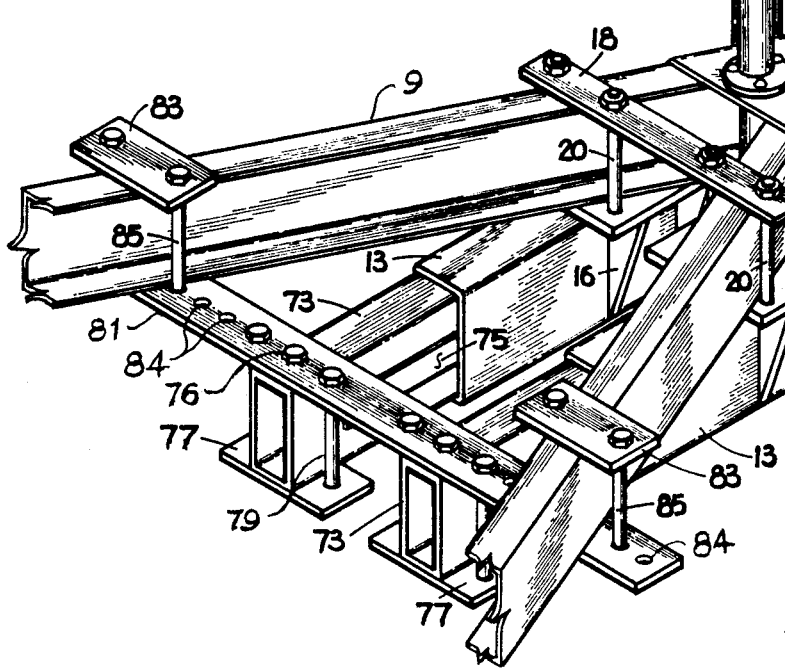
Fig. 2

TRAILER FIFTH WHEEL-GOOSENECK CONVERSION ADAPTER

The present invention relates to apparatus for permitting a trailer or similar vehicle intended to be towed from a rear-mounted ball hitch on a truck to rather be coupled to and towed by a truck having a fifth wheel type hitch. For many years the most common type of trailer hitch arrangement for stock trailers, boat trailers, other recreational vehicle trailers, and others has been the ball hitch (a ball of one of several standard sizes is mounted on or near the rear bumper of the towing vehicle, and a cooperating socket element with a downward facing opening is mounted on the forward end of the tongue of the trailer). More recently, however, a hitch of the fifth wheel and goose-neck type has become quite popular, and it is perceived to have advantages with regard to minimizing "fish tailing" and providing better mobility and shorter turning radius.

In the fifth wheel type hitch a conventional socket is pivotally mounted in the bed of a pickup or other truck which accepts a kingpin mounted on the end of a gooseneck rigidly secured to the body or chassis of the trailer. Of course, a truck may be provided with both a fifth wheel fixture and a ball hitch fixture so that it may tow either type of trailer. However, the owner of a ball hitch trailer cannot achieve the advantages of the gooseneck and fifth wheel type hitch arrangement short of major reconstruction or trading in the trailer for a gooseneck equipped model.

The present invention provides an adapter for most common types of trailers which will convert them to a gooseneck and fifth wheel towing arrangement and gain the advantages which that arrangement provides. The ruggedness of the adapter meets or exceeds that of original equipment gooseneck trailer arrangements, and yet it is readily attached to common varieties of trailer tongues using only common wrenches or other tools, and without the necessity of hoists or lifts.

The three major parts of the adapter assembly can be locked together with padlocks after they are assembled on the trailer tongue, thereby providing security against theft of the adapter or the trailer, or both.

Previous attempts have been made to effectively provide both a ball type hitch and a gooseneck type hitch for a trailer as illustrated, for example, in U.S. Pat. No. 3,698,740 to Eugene H. Chisholm, granted Oct. 17, 1972, Class 280/491D.

Such attempts, however, have required frame members to be built into the trailer frame by welding or the like, and they effectively required that the dual hitch arrangement be incorporated in the original equipment of the trailer rather than being an adapter device for attachment on a wide range of existing ball hitch trailers.

In addition to providing the features and advantages described above, it is an object of the present invention to provide an adapter apparatus for permitting a trailer with a conventional tongue and ball hitch to be towed by a truck having a fifth wheel type hitch, wherein a gooseneck apparatus is provided which is both vertically adjustable and longitudinally adjustable so that the trailer may be towed by trucks with beds of different length or height having a fifth wheel type hitch mounted therein.

It is another object of the present invention to provide such an adapter apparatus wherein the gooseneck is of rectangular cross-section and is slidably mounted in an elevated horizontal arm of slightly larger similar cross-section to achieve longitudinal adjustability of the position of the gooseneck end and kingpin relative to the trailer tongue.

It is still another object of the present invention to provide such an adapter wherein at least one upright steel column of rectangular cross-section is secured on the trailer tongue, and is slidably engaged by a gooseneck mounting element, thereby providing vertical adjustability of the position of the gooseneck.

It is still another object of the present invention to provide such an adapter appartus wherein clamping bars are provided to clamp the base of the upright columns to the trailer tongue in two or more selectable positions, thereby accommodating to trailer tongues of different size, or tongues on which there are fuel tanks or other obstructions.

Other objects and advantages will be apparent from consideration of the following description in conjunction with the appended drawings in which:

FIG. 1 is a side elevational veiw of fifth wheel-gooseneck adapter apparatus for hitching trailers to a towing vehicle by means of a gooseneck shown in side elevational view;

FIG. 2 is a fragmentary isometric view thereof, particularly showing detail of connection of the apparatus to a typical trailer tongue with ball hitch;

FIG. 4 is a sectional view taken along the line 4—4 in FIG. 3.

Figure 3:
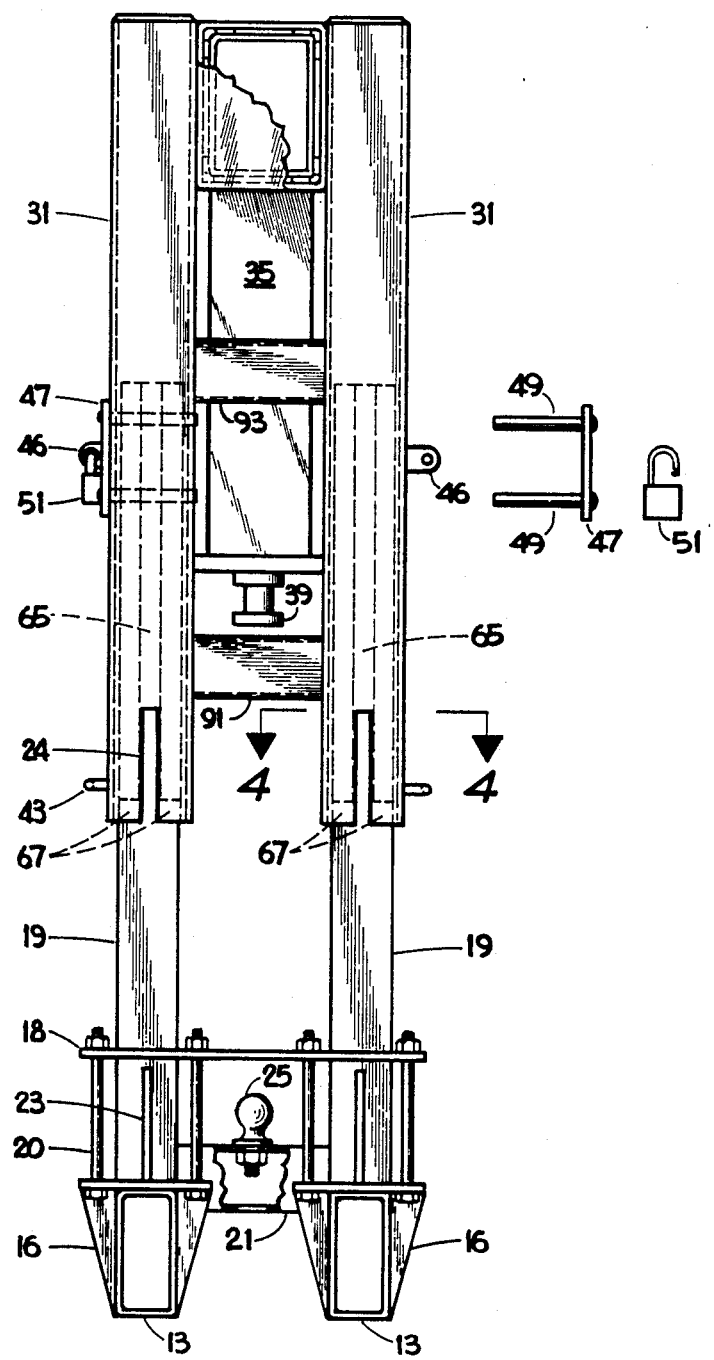
FIG. 3 is a rear elevational view thereof partially broken away to show detail.

Referring now to the drawings, and particularly to FIG. 1, fifth wheel adapter apparatus 11 is shown including lower arms 13 having tongue bearing plates 15 secured thereon and braced and rigidified by gusset plates 16. Holes 17 in plate 15 accommodate bolts 20 which pass through holes in tongue clamping bar 18 allowing a tongue 9 to be securely clamped relative to arms 13 as best shown in FIG. 2. It is contemplated that the structure of adapter apparatus 11 will be formed in the preferred embodiment by welding steel plate and rectangular tube members of commonly available sizes to form the illustrated structure. Of course, the structure may be formed in other manners, or of other materials, within the scope of the invention as it may be deemed appropriate.

A pair of columns 19 are welded or otherwise secured to arms 13 to form an L-shaped structure which is preferably strengthened and reinforced by gusset plates 23. A beam 21 of rectangular steel tube is welded between columns 19 so that they and arms 13 are rigidly secured in the position shown in FIGS. 2 and 3. Preferably a conventional ball 25 is mounted on beam 21, and serves to engage a ball receptacle 2 on trailer tongue 9.

Thus the apparatus shown in FIG. 3 is adapted to securely fasten to a trailer tongue, particularly a tongue of short length (not shown) causing adapter apparatus 11 to be securely and rigidly fastened to the tongue and effectively made a continuation thereof. Additional apparatus later to be described with reference to FIG. 2 may be employed with longer trailer tongues to secure the adapter to the tongue, particularly in instances where clamping strap 18 is unusable, because of interference with equipment mounted on the tongue or for other reasons.

Columns 19 fit in a telescoping manner in vertical tubes 31 which are welded or otherwise secured at right angles to a horizontal tube 33, thereby forming a gooseneck mounting element. A brace in the form of a gusset 78 may be welded at the junction of each vertical tube 31 and horizontal tube 33.

Gooseneck 35, having a horizontal section 36 and an end plate 37, is mounted in telescoping fashion in horizontal tube 33. A kingpin 39 of conventional form having a groove 41 will engage the conventional fifth wheel mounting element on the bed of a pickup truck or other vehicle in accordance with conventional practice.

A handle 43 is provided at the bottom of vertical tube 31 to aid in lifting mounting element 31-33 onto columns 19. Holes 44 in column 19, and similar holes 44 in horizontal extension 36, provide adjustability for the relative positions of the three major portions of the apparatus. A pair of holes 45 in horizontal tube 33 may be matched with a selected pair of holes 44 in column 19; and pin fixture 47, having a pair of hardened steel pins 49 secured thereto, may be inserted through holes 45 and selected ones of holes 44 to lock vertical tube 31 relative to column 19. Staple element 46 passes through a rectangular hasp-like opening in pin fixture 47 allowing it to be locked in place by means of a conventional padlock 51. This both assures that pin fixture 47 will not be accidentally displaced and also provides security against tampering or theft. Each set of a column 19 and vertical tube 31 is preferably provided with a pin fixture 47 and lock 51.

A similar pin fixture 47 will be employed to lock gooseneck 35 relative to horizontal tube 33 by insertion of the pins in holes 55 and a selected pair of holes 44 in extension 36. Staple element 53 provides the same function as staple element 46 on vertical tube 31.

In the preferred embodiment illustrated the desired clearance between telescoping elements of the structure is obtained using common sizes of rectangular tubing for horizontal extension 36, horizontal tube 33, vertical tube 31, and columns 19, together with one-eight inch spacer strips 61, 63, 65, and 67.

By way of example (and not limitation) the gooseneck horizontal extension 36 may be formed of five inch by seven inch rectangular steel stock, and horizontal tube 33 may be six inches by eight inches outside dimensions. The inside dimensions of tube 33 would then be approximately five and one-half inches by seven and one-half inches.

It is desired to have a smaller clearance between horizontal extension 36 and the inside of horizontal tube 33, and accordingly spacer strips 61 are provided with a width of about one inch and a thickness of about one-eighth inch secured on the outside of horizontal extension 36. Spacer strips 61 may be secured in place by spot welding, or by any other suitable means. Although one-eighth inch steel stock is used for spacer strips 61 in the preferred embodiment, other materials may be used including hard plastic such as nylon or the like. Such strips would be secured in place by the use of appropriate adhesives, machine screws or other fasteners. A short spacer 63 is secured near the end of the tube 33 on the inside surface to maintain horizontal extension 36 centered within the end of horizontal tube 33 regardless of the position to which it is adjusted.

At the maximum extension of horizontal extension 36 spacer strip 61 will still be entirely within horizontal tube 33, but near the outer end thereof and approximately straddling short spacer 63.

The arrangement of spacers for horizontal tube 33 and horizontal extension 36 is similar to that for columns 19 and vertical tubes 31 shown in section in FIG. 4. In the preferred embodiment each vertical tube 31 is formed of rectangular stock with outside dimension of four inches by seven inches, and each column 19 is formed of rectangular steel stock with outside dimensions of three inches by six inches. Again, the inside dimensions of the outside tube 31 are one-half inch greater that the outside dimensions of the inside member consisting of column 19, that is tube 31 has inside dimensions of about three and one-half inches by six and one-half inches. As readily seen in FIG. 4 spacer 61 and 63, similar to those previously described, take up a portion of the clearance space leaving nominally one-eighth inch clearance between the broad faces of columns 19 and the inside surfaces of vertical tubes 31.

The narrow faces of column 19 are provided with single spacer strips 65, which may also be seen in dashed lines in FIG. 3, and short spacers 67 are provided on the inside surface of horizontal tube 31 near the lower end thereof. It will be noted that the spacer configuration of horizontal tube 33 and horizontal extension 36 is substantially the same as that shown in FIG. 4 with single spacer strips 65 on the narrow faces of horizontal extension 36 and short spacers 67 on the narrow inside wall of horizontal tube 33 near the end thereof.

Horizontal extension 36 is shown in FIG. 1 at its least extended position, which is to say that holes 55 are aligned with the most forward ones of holes 44. Somewhat more than one foot of forward adjustment is therefore available for gooseneck 35 by aligning the rearmost holes 45 in horizontal extension 36 with the holes 55 in horizontal tube 33.

On the other hand vertical tube 31 is shown at an intermediate position of adjustment relative to column 19, an vertical tube 31 may be raised two hole positions or lowered by three hole positions from the position shown in FIG. 2. This too is a total adjustment of somewhat more than one foot.

An illustrative embodiment of the structure for securing an adapter according to the invention to the tongue of a conventional ball hitch trailer is shown in FIG. 2 in detail. The tongue clamping bar 18 and bolts 20 previously described may in some instances be the only means necessary for securing the adapter to the trailer tongue (other than ball 25 engaging ball receptacle 2). This will, in particular, be the case with trailers with short tongues. It will further be noted that there are two sets of holes 17, only one being in use in the arrangement of FIG. 2, and this provides adjustability for the position of clamping bar 18.

In the case of long trailer tongues or in circumstances where there is an obstruction such as a fuel tank which would prevent the use of clamping bar 18, mounting struts 73 may be provided which fit in a telescoping fashion in the lower arms 13; they are provided with spacer strips 75 on the sides and bottom in a manner corresponding to the arrangement of spacer strips 65 of FIG. 4. Preferably a double thickness spacer strip (not shown) is secured on the bottom of strut 73 rather than having a spacer strip on the top of strut 73. This keeps the upper surface of strut 73 more nearly level with the top of arm 13.

Bottom clamp plates 77 are held in place by bolts 76, but may alternatively be welded or otherwise permanently secured to the bottom of struts 73. Alternatively cross-bar 81 may be welded or otherwise secured permanently to struts 73 rather than being clamped by means of bolts 79 as shown in FIG. 2. In either case, cross-bar 81 may be in the form of an angle iron with one flange thereof extending over the end of strut 73 if desired.

Tongue 9 is secured to cross-bar 81 by means of clamping plates 83 and bolts 85 in a manner generally similar to that decribed with respect to clamping bar 18 and bolts 20. A plurality of holes 84 for bolts 85 are provided in cross-bar 81 to accommodate tongues of different size and shape.

It should be noted that the mounting arrangement including cross-bar 81 and clamping plates 83 may be used alone for the mounting arrangement, or clamping plate 18 and bolts 20 may be used alone, or they both may be used together, as may be appropriate in a particular installation.

There is no restriction on the sliding movement of strut 73 in arms 13, and thus maximum adjustability of the position of clamps 83 on tongue 9 is provided. Fore and aft motion between tongue 9 and the adapter is restrained primarily by the ball 25 and the ball receptacle, 2, and additionally by clamping plate 18 if it is used.

As illustrated in FIG. 2 the trailer tongue 9 may be provided with a conventional parking wheel arrangement 70, and the structure of the adapter is such that it may be mounted without interference with the parking wheel 70 which will remain operative with the adapter installed. While the rectangular cross-section structural members 73, 13, 19, 33, 35, and 36 are preferred as shown, some of such members may be of circular or other shape cross-section if desired.

The robust construction of the adapter prevents if from being very light in weight, but the assembly is designed so that it can be installed or removed by no more than two persons. The preferred procedure is to secure the horizontal arm 13 and column 19 structure to the trailer tongue by placing the ball receptacle 2 on the ball 25, and then installing clamp bar 18 on the trailer tongue 9. If the clamping bar 18 cannot be used because of interferring structure, or if it is desired to employ both clamping bar 18 and clamping bars 83 then struts 73 are inserted in arms 13, cross-bar 81 is installed and clamping bars 83 are bolted in place on top of tongue 9 to secure the lower portion of the adapter consisting of arms 13 and columns 19 to the trailer tongue. The gooseneck mounting element including vertical tubes 31 and horizontal tube 33 is then put in place with vertical tubes 31 in telescoping relation to columns 19, and at their maximum height.

Gooseneck 35 is then placed with the horizontal extension 36 inside horizontal tube 33. The adapter is then ready to be fitted to the particular truck which is to pull the trailer by adjusting the vertical height and horizontal extension of the gooseneck and securing the vertical and horizontal position by means of pin fixtures 47 and conventional padlocks.

As will be seen from the foregoing discussion and detailed description, the adapter of the present invention provides a trailer fifth wheel-gooseneck conversion adapter which is demountable for convenient storage and shipping and yet which is readily installed on a conventional ball hitch trailer. The adjustability features provided make the adapter almost universally suitbale to a wide variety of trailers and/or sized and heights of towing vehicles.

In addition to the variations and modifications of the invention shown or suggested herein, it will be apparent to those of skill in the art that other modifications and adaptations may be made to the invention, and accordingly the scope of the invention is not to be considered limited to the particular embodiments described or suggested, but is rather to be determined by reference to the appended claims.

What is claimed is:

1. Fifth wheel-gooseneck adapter apparatus for towing a ball hitch trailer behind a truck having a fifth wheel hitch comprising
    a pair of vertical column members secured together in spaced relation at their lower ends,
    coupling means for rigidly mounting said lower ends of said column members on the tongue of said trailer and including a ball for mating with the hitch of said trailer,
    a vertically adjustable gooseneck mounting element mounted in vertical sliding engagement with upper ends of said column members,
    a gooseneck having a fifth wheel kingpin at one end adapted to engage the fifth wheel mount of a truck, the other end of said gooseneck slidably engaging said mounting element with relative motion therebetween constrained to a horizontal fore and aft direction,
    means for locking said mounting element in a selected vertical position relative to said column members and
    means for locking said gooseneck in a selected horizontal position relative to said mounting element.

2. Apparatus as recited in claim 1 wherein said adjustable gooseneck mounting element has elongated hollow vertical portions the interior cross-sections of which are of polygonal shape matching the exterior polygonal shapes of said column members.

3. Apparatus as recited in claim 1 wherein said gooseneck comprises a horizontal extension of rectangular cross-section shaped to fit in an opening in said mounting element and a downward, obliquely extending front portion having said kingpin secured extending downwardly therefrom.

4. Apparatus as recited in claim 1 wherein said means for locking said mounting element relative to said column members comprises at least a pair of holes in said mounting element and at least a pair of holes in one of said column members the holes of said pairs of holes being equally separated, and generally U-shaped double pin element for insertion through the holes in said mounting element and in said column members.

5. Apparatus as recited in claim 4 further including a staple adjacent the holes on said mounting element and a cooperating hasp portion on said U-shaped element adapted to accept a padlock and prevent unauthorized removal of the means for locking said mounting element relative to said column members.

6. Apparatus as recited in claim 1 wherein said coupling means includes two horizontal beams extending backward from said column members and having means for clamping each of said beams to the underside of a conventional V-shaped trailer tongue.

7. Fifth wheel adapter apparatus for towing a ball hitch trailer behind a truck with a fifth wheel hitch comprising
    a vertical column member with means for fixedly securing said vertical column member at its lower end to a ball hitch trailer tongue,
    a removable vertically adjustable gooseneck mounting element on said mounted vertical column member at its upper end, a gooseneck having a fifth wheel kingpin at one end for pivotal engagement with a fifth wheel hitch mounted on a truck bed secured in a removable longitudinally horizontally adjustable manner to said mounting element, means for locking said gooseneck mounting element, and coupling means comprising horizontal arm means extending backward from said vertical column member and having means for clamping said arm means to the underside of a conventional trailer tongue and a ball for mating with the hitch of the trailer.

8. Apparatus as recited in claim 7 wherein said adjustable gooseneck mounting element has an elongated hollow vertical portion the interior cross-section of which is of polygonal shape matching the exterior polygonal shape of said column member.

9. Apparatus as recited in claim 7 wherein said gooseneck comprises a horizontal extension of rectangular cross-section shaped to fit in an opening in said mounting element and a downward, angularly extending front portion having said kingpin secured extending downwardly therefrom.

10. Apparatus as recited in claim 7 wherein said means for locking said mounting element relative to said column member comprises at least two holes in said mounting element and two holes in said column members said sets of holes being equally spaced and a generally U-shaped double pin element for insertion through the holes in said mounting element and in said column member.

11. Apparatus as recited in claim 10 further including a staple adjacent the holes on said mounting element and a hasp portion on said U-shaped element adapted to accept a padlock and prevent unauthorized removal of the means for locking said mounting element relative to said column members.

12. Fifth wheel adapter apparatus for towing a ball hitch trailer behind a truck with a fifth wheel hitch comprising a vertical column member with means for fixedly securing said vertical column member at its lower end to a ball hitch trailer tongue, a removable vertically adjustable gooseneck mounting element on said mounted vertical column member at its upper end, a gooseneck having a fifth wheel kingpin means for pivotal engagement with a fifth wheel hitch mounted on a truck bed secured in a removably longitudinally horizontally adjustable manner to said mounting element, and means for locking said gooseneck mounting element to said column member comprising at least a pair of holes in said gooseneck mounting element and at least a pair of holes in said vertical column member, the holes of said pairs of holes being equally separated, and a generally U-shaped double pin element for insertion through the holes and in said mounting element in said vertical column member.

13. Apparatus as recited in claim 12 further including a staple adjacent the holes on said mounting element and a cooperating hasp portion on said U-shaped element adapted to accept a padlock and prevent unauthorized removal of the means for locking said mounting element relative to said column member.

14. Apparatus as recited in claim 13 wherein said adjustable gooseneck mounting element has an elongated hollow vertical portion the interior cross-section of which is of polygonal shape matching the exterior polygonal shape of said column member and is slidably mounted thereon.

15. Apparatus as recited in claim 13 wherein said gooseneck comprises a horizontal extension of rectangular cross-section shaped to fit in an opening in said mounting element and a downward, angularly extending front portion having said kingpin secured extending downwardly therefrom.

16. Apparatus as recited in claim 12 further including coupling means includes horizontal beams extending from said column member having means for clamping said beam to the underside of conventional trailer tongue.

17. Fifth wheel adapter apparatus for towing a hitch trailer behind a truck having a fifth wheel hitch comprising a pair of vertical column members of rectangular cross-section secured together in spaced relation at their lower ends, coupling means for rigidly mounting said column members on the tongue of said trailer including a ball for mating with the hitch of said trailer and two horizontal arms extending backward from said lower ends of said column members and having means for clamping each of said arms to the underside of a conventional V-shaped trailer tongue, a vertically adjustable gooseneck mounting element mounted in vertical sliding engagement with said vertical column members at its upper end, said adjustable gooseneck mounting element having an elongated hollow vertical portion the interior cross-section of which is of rectangular shape matching the exterior rectangular shape of said column members, a gooseneck comprising a horizontal extension of rectangular cross-section shaped to fit in an opening in said mounting element and a downward, angularly extending front portion having said kingpin secured extending downwardly therefrom, said gooseneck being shaped to slidably engage said opening in said mounting element with relative motion therebetween constrained to a horizontal fore and aft direction, means for locking said mounting element in a selected position relative to said vertical column members, comprising at least a pair of holes in said mounting element and at least a pair of holes in one of said vertical column members, the holes of said pairs of holes being equally separated, and a generally U-shaped double pin element for insertion through the holes in said mounting element and in said vertical column members, and means for locking said gooseneck in a selected position relative to said mounting element.

* * * * *